United States Patent [19]

Macharg

[11] 3,800,208

[45] Mar. 26, 1974

[54] BATTERY CHARGERS

[76] Inventor: James Adrian Macharg, 16, Elmfield Park Gosforth, Newcastle Upon Tyne, England

[22] Filed: Nov. 8, 1972

[21] Appl. No.: 304,590

[30] Foreign Application Priority Data

| | | |
|---|---|---|
| Nov. 16, 1971 | Great Britain | 53141/71 |
| June 12, 1972 | Great Britain | 27355/72 |

[52] U.S. Cl. .................................... 320/20, 320/39

[51] Int. Cl. .................................... H02j 7/04

[58] Field of Search ............ 320/14, 39, 40, 43, 24, 320/22

[56] References Cited

UNITED STATES PATENTS

| | | | |
|---|---|---|---|
| 3,590,358 | 6/1971 | Ruben | 320/24 |
| 3,624,481 | 11/1971 | Macharg | 320/39 |
| 3,660,748 | 5/1972 | Clayton | 320/39 |

*Primary Examiner*—J. D. Miller

*Assistant Examiner*—Robert J. Hickey

*Attorney, Agent, or Firm*—Toren, McGeady & Stanger

[57] ABSTRACT

A controlled current battery charger in which the charging current is cycled between upper and lower limits at varying rates throughout the charging period dependent on firstly a comparison between a reference voltage which is itself varied between upper and lower limits and the battery terminal voltage, and secondly the integrated value of the ON/OFF ratio of the time that switch means, operable from the result of the comparison of the reference voltage with the battery terminal voltage, is actuated, said switch means having an ON time which is either a substantially constant value or is itself varied in accordance with its own integrated output, the reference voltage being varied also in accordance with the integrated output of the switch means. The integrated output from said switch means which is utilized firstly to vary the ON time of said switch means and secondly to vary the reference voltage may be inverted so as to provide one of four different types of charging cycles.

23 Claims, 7 Drawing Figures

W
V
R1
R2
R3
R4
R5
R6
R7
R8
R9
R10
R11
R12
R13
R14
R15
R16
R17
R18
R19
R20
R21
R22
R23
R24
R44
TR1
TR2
TR3
TR4
TR5
TR6
TR7
TR8
TR9
TR10
TR11
Z1
Z2
Z3
Z4
Z5
Z6
Z7
Z8
C1
C2
Rf(v)
Rf(f)
Rf

TH1
TH2
TH4
THR
THI-TH4
G
B
Z12
R46
R45
Z11
D2
TR22
R47
Z
R42
TR21
TR20
R41
C4
R39
R40
TR19
R38
R37
Z10
R 43
C5
Y
X
Z9
P1
R30
R29
TR14
TR15
R28
TR13
R27
R26
C3
D1
R25
TR12
TR16
R31
TR17
R32
R34
R35
TR18
R36
R33

BATTERY CHARGERS

This application relates to my copending application Ser. No. 108,317, filed Jan. 21, 1971.

The present invention relates to battery chargers for charging batteries more particularly of the lead-acid or nickel-cadmium type.

One such battery charger is disclosed in my U.S. Patent Application Ser. No. 108,317. This battery charger utilizes an advanced form of control of charging current for batteries which employs limitation of the terminal voltage of the battery by effectively switching off or otherwise reducing the charging current when a predetermined limit has been reached, and switching on again or otherwise increasing the charging current when the terminal voltage has dropped below the limit by a predetermined amount of backlash. Further, the limit of the terminal voltage is a function of the integral of the varying charging current, so providing apparent effects of negative resistance in the power supply, whereby tendency towards a lower current being drawn by the battery ensures a lesser tendency for terminal current to be supplied so allowing control of the gassing rate. In one preferred form, the system is designed utilizing only "solid state" components without relays or contactors in any form.

In the battery charger system of my Patent Application Ser. No. 108,317, initially when a nearly discharged battery is connected to the charger, the period during which the charging current is "on" is relatively long compared with the time it is cut "off". As charging progresses, the "on" period becomes sharter and the "off" period becomes longer. When the battery is very nearly fully charged the "on" is very short whilst the "off" period is very long, it taking a long time for the terminal voltage to drop sufficiently to cause the charger to switch on.

At all stages during the charging cycle, the terminal voltage of the battery was compared with a reference voltage which was varied between low and high limits from the integrated output of the ON/OFF ratio. Thus the terminal voltage was prevented from rising above an upper limit as determined by the difference between the terminal voltage and the reference voltage.

It is an object of the present invention to provide a modified form of battery charger in which an idealized charging cycle is achieved not by limiting the terminal voltage.

According to the present invention there is provided a battery charger for charging batteries by cyclically increasing and decreasing the magnitude of the charging current towards given upper and lower limits: including means for deriving a reference voltage; comparator means for comparing this reference voltage with the terminal voltage of the battery; time controlled switching means operable from the comparator means for providing a constant output signal for a substantially predetermined period every time the terminal voltage drops below a given value in comparison with the instantaneous value of the reference voltage after the termination of the predetermined period; means for integrating the output of the switch means; means for progressively varying the reference voltage between predetermined upper and lower limits in accordance with the integrated value of the ON/OFF ratio of the switch means; and means for controlling the variation of said charging current between said upper and lower limits in accordance with the output of said switch means.

The mode of operation is thus such that when the reference voltage of the battery falls below a given value as determined by the instantaneous value of the reference voltage, the charging current is increased towards the upper given limit for the given period and the integrated output of the ON/OFF ratio of the switch controls the reference voltage causing it to rise towards its upper limit during the "on" period and to fall towards its lower limit during the "off" period of charging.

As charging proceeds the "off" period of the switch means thus increases in relation to the substantially fixed "on" period, which may be relatively short.

The given lower limit to which the charging current is reduced in each cycle may be zero.

Additionally, means may be provided for controlling the time controlled switching means so as to vary the "on" period of the switch means in accordance with the state of charge of the battery.

Furthermore, in addition to providing an integrated control for increasing and reducing the charging current, I may provide a degree of superimposed pulsing.

In the case where thyristors are used to control the flow of charging current, circuit means may preferably be provided for counteracting the sine-function which appears between the thyristor control voltage and the charging current, when the thyristor circuit does not itself compensate for the said sine-function.

The charger circuit may also include means for controlling both the "ON" period and the pulse height in the charging current as an inverse function of the charging current.

Means may also be provided by simple adjustment of the circuit constants to terminate the charge period automatically when the battery is suitably charged.

The present invention will now be described in greater detail by way of example with reference to the accompanying drawings, wherein.

Figure 1:
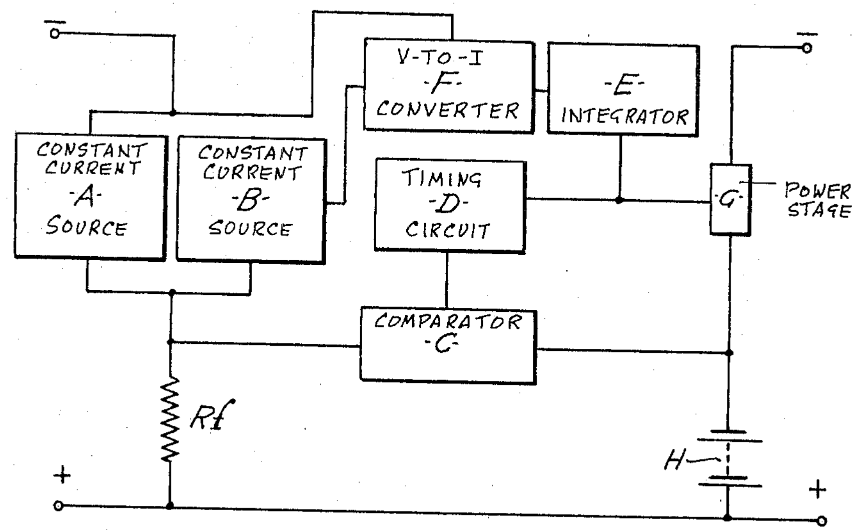
FIG. 1 is a block schematic diagram of one preferred embodiment of battery charger in which the ON period is a substantially constant time.

Referring specifically now to FIG. 1, the battery charger includes first and second controlled current sources A and B respectively; a resistor Rf across which a reference voltage is developed by current flowing therein supplied from the controlled current sources A and B; a voltage comparator C which compares the battery terminal voltage with the reference voltage; a timing circuit D; an integrator E; a voltage-to-current converter F; and a power stage G for switching on and off the charging current to the battery H.

The reference voltage developed across the resistor Rf can be varied from a minimum value E Ref (LOW) up to a maximum value E Ref (HIGH). The lower limit is set when current from the first controlled current source A alone flows through the reference resistor R*f*. The upper limit is achieved when the current through the resistor R*f* is augmented by the maximum current which can be supplied from the second controlled current source B, the second controlled current source being in turn controlled by the voltage-to-current converter F.

The terminal voltage of the battery H is compared with the reference voltage by means of the comparator C which is arranged to provide a signal when the terminal voltage of the battery is below the reference voltage. The signal from the comparator C is arranged to trigger a timing circuit D, the timing circuit then providing an "ON" signal for a substantially predetermined period only. The precise operation of the timing circuit D will be explained later on with reference to FIG. 5.

The "on" signal is arranged not only to switch "ON" the charging current through the power stage G, but also to be integrated with the "off" state by the integrator E, whose output provides a signal which is a function of the integral of the times for which the charging current is "on" and "off", the output being fed as a voltage into the voltage-to-current converter F.

The operation of the above battery charger circuit will now be described in greater detail. In the initial quiescent state, no battery being connected, there is no imbalance in the comparator C which in consequence provides no output signal, hence the timing device D is not activated, no charging current flows, and there is no output from the integrator E nor signal into the voltage-to-current Converter F, hence no current is supplied to the second constant current source B. Thus the only current passing through the reference resistor Rf is that from the first constant current source A, and the reference voltage is in consequence at its lower limit E Ref (LOW).

The lower limit E Ref (LOW) may conveniently be of the order of the terminal voltage of a fully charged and fully settled battery without current flowing through its terminals.

upon connecting a battery H which is not fully charged, and whose terminal voltage must in consequence settle eventually to a value below the reference voltage E Ref (LOW), the comparator C will supply an output which will trigger the timing device D which then provides an "on" signal for a substantially predetermined period only, thus causing a charging pulse of fixed length of time to be applied to the battery H via the power stage G. When the battery terminal voltage rises above the reference voltage at its higher level E Ref (HIGH), the charging current is not cut off, but continues for the predetermined period, and hence the terminal voltage of the battery is never limited.

During the first charging period an output appears at the integrator E so causing the reference voltage to rise to its upper limie E Ref (HIGH) through the agency of the voltage-to-current converter F and the second controlled current source B.

At the end of the first charging period, the terminal voltage of the battery will commence to settle to a lower value. If the value of the reference voltage E Ref (HIGH) was not exceeded, the timing device D will be immediately triggered once more. If the terminal voltage exceeded the reference voltage E Ref (HIGH), then eventually the terminal voltage of the battery will settle to a value lower than the reference voltage, and the comparator C will be unbalanced once more. In either case a second charging period of equal length to the first will commence, and this sequence of events will continue, the "ON" period always being substantially constant, but the "OFF" period gradually increasing as charging progresses.

However, if the battery is nearly discharged, its terminal voltage will settle quickly to a low value, whilst if it is nearly charged, the terminal voltage will settle more slowly and to a higher value. It will thus be seen that the length of the "off" period is a direct function of the state of charge of the battery.

As charging continues then, the average charging current, being a direct function of the ON/OFF ratio will eventually reduce. However, the ON/OFF ratio is integrated by the integrator E, whose output effectively controls the reference voltage developed across the resistor Rf. Thus, when the battery is discharged it tends to draw a higher current by virtue of a short "off" period which effectively raises the reference voltage to E Ref (HIGH) as a result. This in turn means that the terminal voltage can settle more quickly to the value of E Ref (HIGH) and hence the "off" period is forced to remain short and the charger will supply the maximum output of which it is capable in rapidly repeating bursts.

Eventually however, because the reference voltage is never allowed to exceed the upper limit set by the sum of the currents from the two controlled current sources A and B, there comes a point when the time taken for the terminal voltage to settle to the value of the reference voltage begins to reduce. As a direct consequence, the current is reduced and the output of the integrator E is reduced also, so commencing a reduction of the reference voltage, which in due course approaches its lower limit E Ref (LOW), to which the battery takes a longer time to settle.

Figure 5:
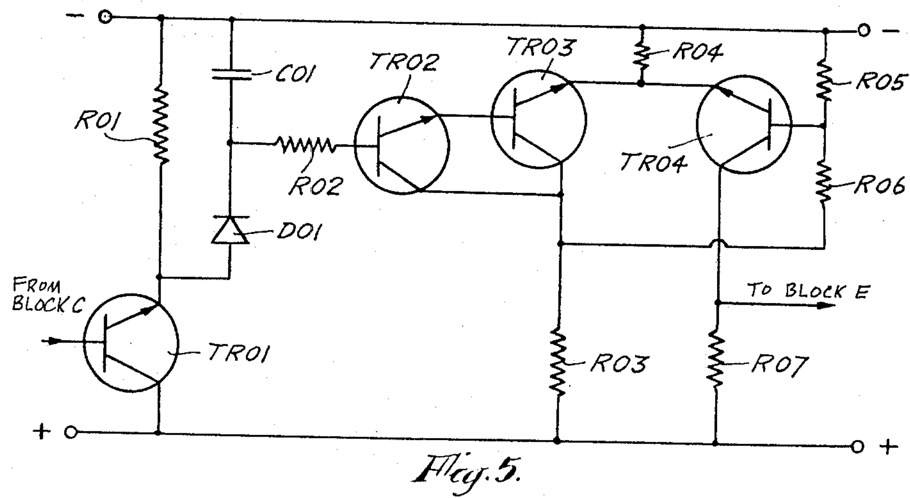
FIG. 5 is a circuit diagram of the timing circuit (block D) of the FIG. 1 embodiment.

Referring now to FIG. 5, the timing circuit D includes transistors TRO1 to TRO4, resistors RO1 to RO7, a capacitor CO1 and a diode DO1. The transistor TRO1 has its base electrode connected to the output from the comparator C. The capacitor CO1 is arranged to be charged through this transistor TRO1 and the diode DO1 when the transistor is conductive. Transistors TRO2 and TRO3 are arranged as a Darlington pair and together with transistor TRO4 form a Schmitt trigger. The output from the Schmitt trigger which is applied to both the integrator E and the power stage G is taken across the resistor RO7 in the collector circuit of the transistor TRO4.

In operation, when the comparator C turns on, the transistor TRO1 conducts which charges the capacitor CO1 through the diode DO1. When the potential at the base electrode of the transistor TRO2 has risen sufficiently, the Darlington pair conducts which turns off the transistor TRO4. The Schmitt trigger thus gives a constant positive output signal and charging current flows. When the battery terminal voltage exceeds the reference voltage, the comparator reverts to a zero output signal and the transistor TRO1 is blocked. Since the capacitor CO1 cannot discharge through the resistor RO1 because of the presence of the diode DO1, the positive bias is maintained for the Darlington pair which remains conductive. However, the charge on the capacitor CO1 slowly leaks away through the base electrodes of the Darlington pair, and after a constant time from the time that the comparator C turned off, the Schmitt trigger reverses its state cutting off the constant positive output signal. Since the "on" period of the timer is long compared with the "on" period of the comparator C, the timing circuit may be said to give an output signal for a substantially constant period. This may be arranged by making the circuit components of the integrator E and voltage-to-current converter F such that the reference voltage rises slowly such that at the initial stages of charging the battery terminal voltage rapidly exceeds the reference voltage. The comparator C then switches to provide a zero output, but the timing circuit then remains on for its constant time which is thus a major portion of the total time. Thus throughout the whole process of charging the output from the timing circuit D provides substantially constant "ON" period for the integrator E.

Figure 2A:
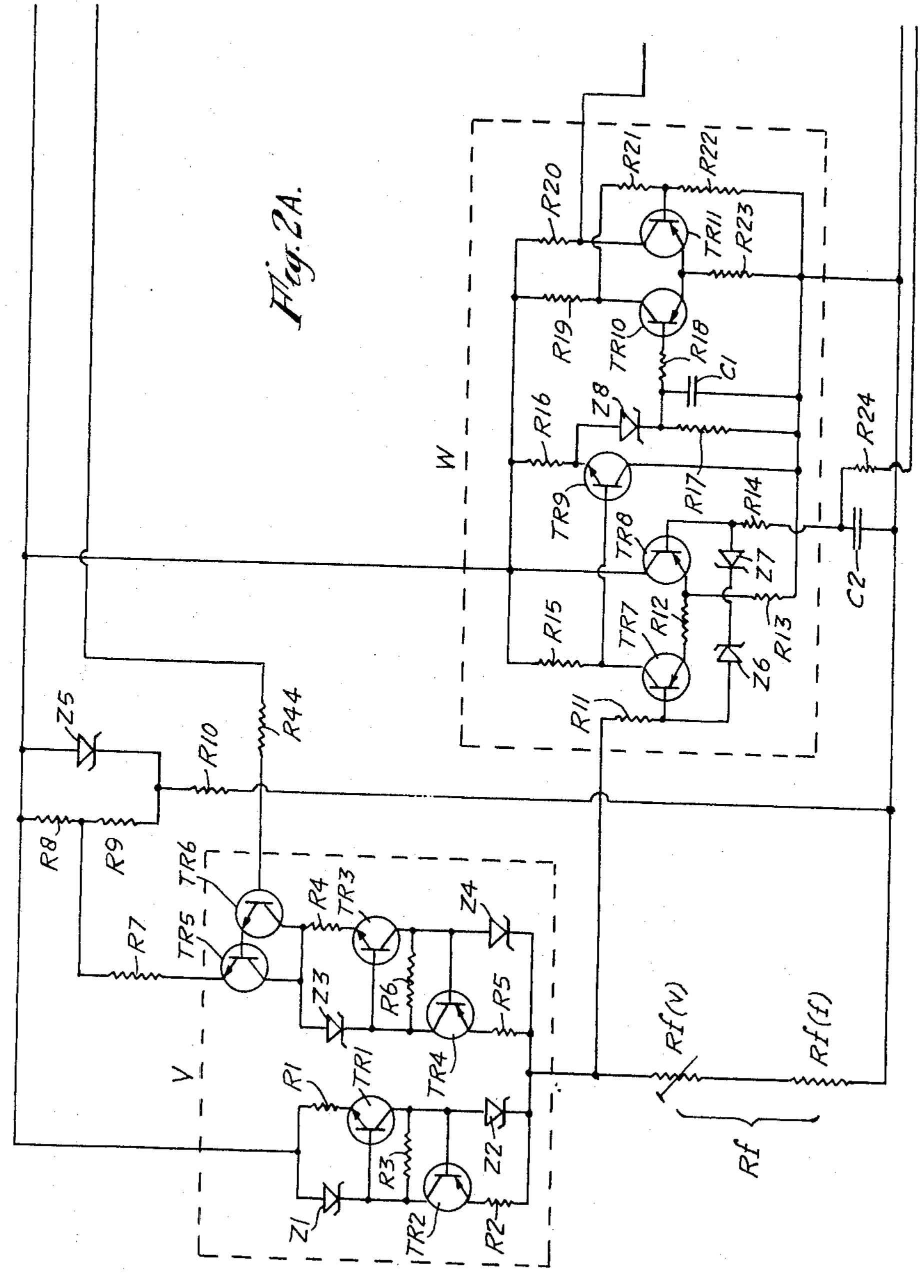
FIGS. 2A and 2B are detailed circuit diagrams of a second preferred embodiment of battery charger in which the ON period is controlled and varied in accordance with the state of charge of the battery.
Figure 2B:
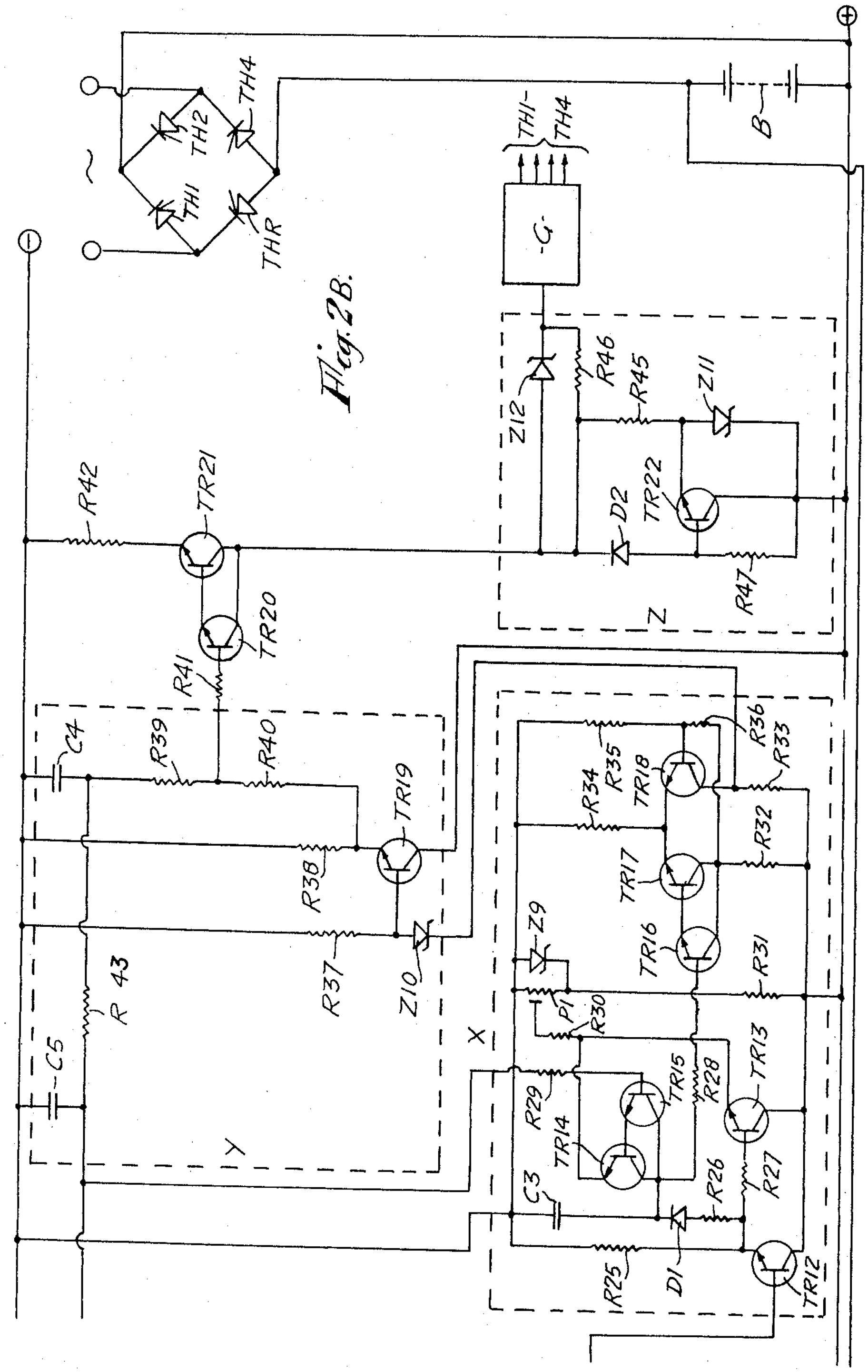

Referring now to FIG. 2, the circuit includes the following blocks which are either identical or equivalent to the ones disclosed in the FIG. 1 embodiment, and for convenience these will be briefly analyzed as follows:

Block V which consists of two parallel arranged controlled current devices each comprising a ring of two. This is identical to blocks A and B in the embodiment of FIG. 1. This block also includes the means for varying the current through the second controlled current device which is identical to block F.

Block W which consists of a comparator and Schmitt trigger being identical to block C.

Block X which consists of a timer being equivalent to block D.

Block Y which consists of an integrator and a low impedance stage for feeding it, the integrator being equivalent to block E.

Block Z which includes a dynamic load.

Referring first to block V, this includes two controlled current devices each comprising a "ring-of-two." . The first "ring-of-two" comprises transistors TR1 and TR2, resistors R1, R2 and R3 and zener diodes Z1 and Z2, and is of similar construction to that disclosed in FIG. 4 of my U.S. Pat. No. 1,225,802. The second "ring-of-two" comprises transistors TR3 and TR4, resistors R4, R5 and R6, and zener diodes Z3 and Z4, and is also of similar construction to that disclosed in FIG. 4 of my U.S. Pat. No. 3,624,481. The two "ring-of-two" circuits are effectively connected in parallel in order to develop the voltage across the reference resistor R*f*, which comprises a fixed resistor R*f*(f) and a preset resistor R*f*(v), whose value of resistance can be adjusted.

In series with the second "ring-of-two" circuit is a Darlington pair comprising transistors TR5 and TR6 having commoned collector electrodes. A potentiometer chain comprising resistors R8, R9 and R10 is connected across the stabilized supply to the battery charger and also across the parallel arrangement of the two "ring-of-two" circuits and the reference resistor R*f*. A zener diode Z5 is connected across the resistors R8 and R9 and a resistor R7 connects the emitter electrode to the junction between the resistors R8 and R9.

Figure 4:
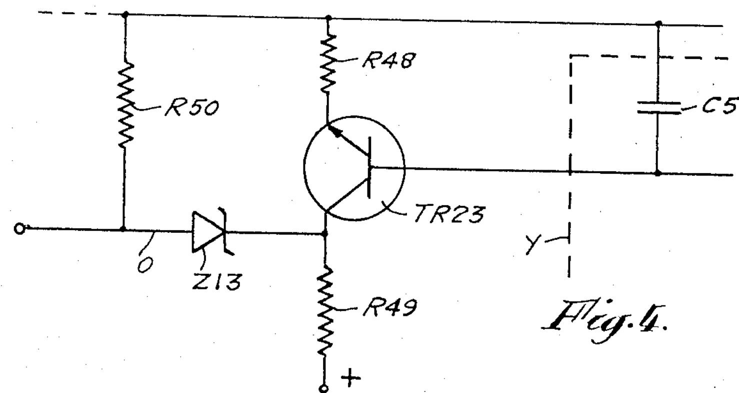
FIG. 4 is a circuit diagram of a phase reversal unit which in a modified form of the circuit of FIG. 2 may be inserted in the output from the integrator in block Y, either between the block Y and the block X or between the block Y and the block V, or both.

The block W comprises the comparator and its associated Schmitt trigger, these circuits being of similar construction to FIG. 4 of my U.S. Pat. No. 3,624,481. The comparator includes transistors TR7 and TR8, resistors R11, R12, R13, R14 and R15 and zener diodes Z6 and Z7. The output from the collector electrode of the transistor TR7 is applied to the base electrode of a transistor TR9 which together with resistors R16 and R17, zener diode Z8 and capacitor C1 form an intermediate stage between the comparator and the Schmitt trigger. The capacitor C1 absorbs instantaneous changes due to the drop across the ohmic resistance of the battery. The Schmitt trigger comprises transistors TR10 and TR11, resistors R18, R19, R20, R21, R22 and R23. The output from the collector electrode of the transistor TR11 passes to the block X. The battery terminal voltage is first smoothed by the network consisting of a resistor R24 and a capacitor C2, whence it is applied to the comparator through the resistor R14.

Block X includes a timing device of similar basic construction to that disclosed in the embodiment of FIG. 1, being preferably a Schmitt trigger controlled by the voltage across a capacitor C3. The Schmitt trigger has a Darlington input, to reduce greatly draining the capacitor C3, and consists of transistors TR16, TR17 and Tr18, and resistors R28, R32, R33, R34, R35 and R36.

Additionally, block X includes an emitter follower stage in order to charge the capacitor C3 more easily, consisting of a transistor TR12 and a resistor R25, and a circuit to control the discharge rate of the capacitor C3, consisting of transistors TR14 and TR15, and the resistors R29 and R30, together with an offset circuit consisting of the preset potentiometer P1, a zener diode Z9 and a resistor R31.

Further block X includes another transistor TR13, connected in such a way as to prevent the transistors TR14 and TR15 discharging the capacitor C3 during its periods of charge through the diode D1 and series resistor R26. The base electrode of the transistor TR13 is connected to the emitter electrode of the transistor TR12 through a resistor R27.

Block Y which contains the integrator includes a capacitor C4, resistors R39 and R40 in series therewith between the negative terminal of the stabilized supply and a zener diode Z10 which acts as a level shift from the output of the timer taken from the collector electrode of the transistor TR18.

The block Y additionally includes a second integrator stage consisting of the resistor R43 and the capacitor C5, in order to further smooth the control voltage for the two Darlington pairs TR5 and TR6, and TR14 and TR15, whose base electrodes are fed via respective series resistors R44 and R29 which serve to prevent excessive base currents being drawn, and so prevent the integrator circuit being loaded.

The output from the block Y is fed to the block Z through a voltage to current converter which comprises two transistors TR20 and TR21 arranged as a Darlington pair with commoned collector electrodes and a resistor R42, the base electrode of the first transistor TR20 being connected to the junction between the resistors R39 and R40, through a resistor R41.

Block Z which constitutes a "dynamic load" includes a transistor TR22, resistors R45, R46 and R47, zener diodes Z11 and Z12 and a diode D2. The output from the commoned collector electrodes of the transistors TR20 and TR21 is connected to the power stage through a parallel circuit consisting of the zener diode Z12 and resistor R46. The output from the Darlington pair TR20 and TR21 is also connected to the base and emitter electrodes fo the transistor TR22 through the diode D2 and resistor R45 respectively. The collector electrode of the transistor TR22 is connected firstly to the positive terminal of the stabilized supply, secondly to the base electrode of the transistor TR22 through the resistor R47 and thirdly to the emitter electrode through the zener diode Z11.

The power stage includes one or more thyristors fired by a trigger circuit, which may be of known type, and connected together in any accepted fashion as a phase-controlled rectifier. A typical phase-controlled bridge rectifier circuit consisting of thyristors TH1, TH2, TH3 and TH4, fired by pulses applied to their gate electrodes from the trigger circuit G is illustrated. As with all phase-controlled thyristor circuits, the conduction time of the thyristors during each half-cycle is a function of the control voltage applied to the trigger circuit G. The output of the bridge rectifier is applied to the battery terminals, the positive terminal of the battery being connected to the positive supply rail of the control circuitry.

It will be appreciated that the characteristics of thyristor trigger circuits lie generally at or between two extreme types. Firstly, those in which the firing angle is an approximate linear function of the control voltage and hence the power transmitted tends to be a sine-function of the control voltage. Secondly, those in which the firing angle approximates to a cosine function of the control voltage and hence the power transmitted tends to be a linear function of the control voltage. The purpose of the block Z is to ensure that the control voltage/charging current relationship is reasonably linear at the lower end. If a trigger circuit were to be used having the second-mentioned characteristics, the block Z would be unnecessary and simply be replaced by a fixed resistance from across which the control voltage would be taken to the trigger circuit.

In the circuit of block Z since the diode D2 balances the base-emitter voltage of the transistor TR22 which barely conducts so long as the resistor R45 in its emitter circuit has current flowing through by reason that the zener diode Z11 is conducting. The transistor TR22 therefore presents a high resistance as long as the voltage across the dynamic load circuit exceeds the breakdown voltage of the zener diode Z11. When the voltage across the dynamic load circuit drops below the breakdown voltage of the zener diode Z11, the transistor TR22 starts to conduct, the amount of conduction being proportional to a function of the amount that the voltage is below the break-down voltage of the zener diode Z11.

Figure 3:
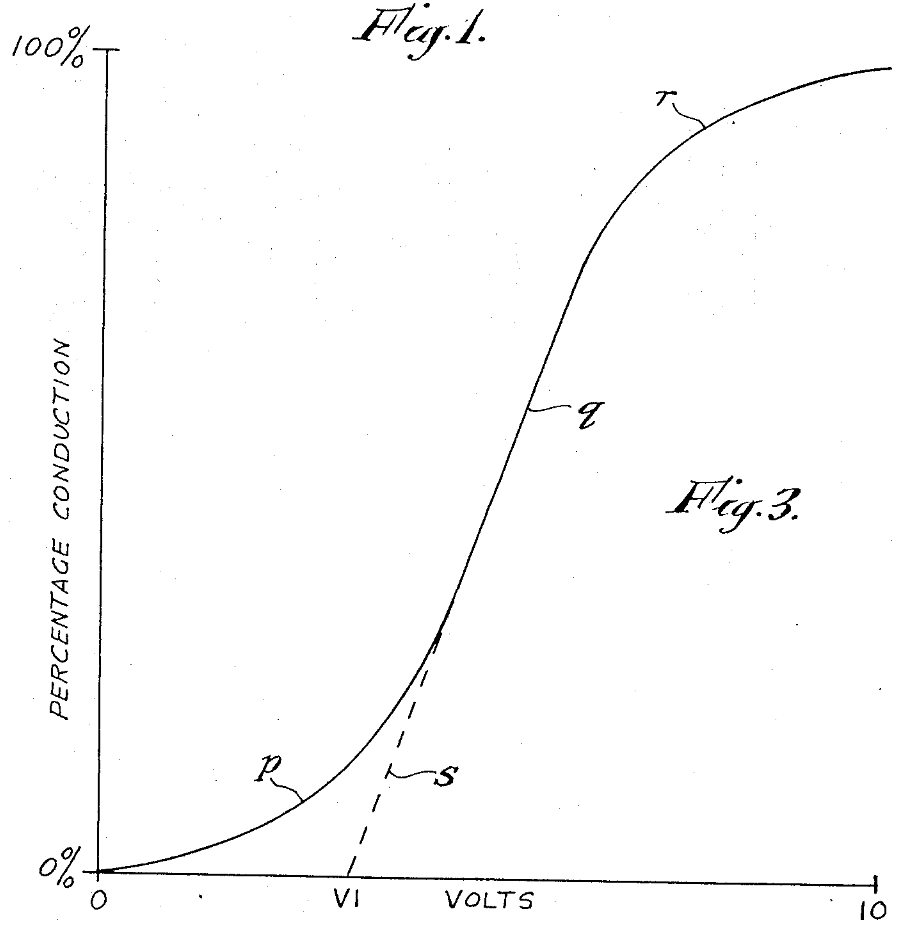
FIG. 3 is a graph which explains the operation of the block Z in FIG. 2B.

Referring now to FIG. 3, which helps to explain the operation of the block Z, it will be seen that the curve of percentage conduction of the thyristors TH1 to TH4 plotted to a base of control voltage is substantially linear over the central part *q* but substantially sinusoidal over the lower and upper parts *p* and *r* respectively. When the current through the dynamic load circuit, as supplied by the Darlingtion pair TR20 and TR21, is low, the voltage across the resistor R47 is low so that the transistor TR22 is turned on, and in consequence the zener diode Z11 is by-passed, and more or less current passes through the resistor R45 depending upon the total current flowing from the Darlingtion pair TR20 and TR21. Thus the lower the current, the lower is the value of the dynamic load, the lower the output voltage, and the lower the charging current.

This action effectively straightens the lower part *p* of the conduction characteristics so that the curve now effectively follows the dotted line *s*. This means that the thyristors TH1 to TH4 would not start to conduct until the voltage across the circuit reached a value of V1 volts. Put simply, the toe of the sinusoidal transfer characteristic is absorbed at low levels.

However, as the current is increased for the Darlington pair TR20 and TR21, there comes the point where the drop across the resistor R47 now causes the transistor TR22 to be cut-off so no longer by-passing the zener diode Z11, which then provides an effective upward shift of the voltage across the dynamic load to the value V1. The said upward shift is then counteracted by the downward shift of the zener diode Z12, the resistor R46 providing a slight bleed to reduce the sharpness of the effect.

Owing to the action of the block Z, there must be a slight current flowing from the Darlington pair TR20 and TR21 before charging current can even commence to flow into the battery, hence there must be a slight forward bias provided by the integrator. This integrator voltage would forward bias the Darlington pairs if it were not off-set by the potentials applied to the emitter electrodes of the Darlington pairs TR5 and TR6, and TR14, TR15, by their respective offset circuits stabilized by the zener diodes Z5 and Z9 respectively.

The precise operation of the blocks V and W which contain the two "ring-of-two" circuits, the comparator and the Schmitt trigger will not be described in detail since they have already been described in detail with reference to FIG. 4 of my U.S. Pat. No. 3,624,481.

Turning now to block X when the Schmitt trigger in block W switches "ON" (transistor TR11 conducting) the output across the resistor R20 is transferred to the resistor R25, being the load of the emitter follower transistor TR12. A current is thus passed through the resistor R26 and the diode D1 to charge the capacitor C3. At the same time, the transistor TR13 is turned on through the resistor R27, so passing a current through the resistor R30, which, being also in the emitter circuit of the Darlington pair TR14 and TR15, causes them to be unbiased and non-conducting.

As the capacitor C3 charges up, the voltage at the base electrode of the transistor TR16 causes transistors TR16 and TR17 to switch on, and the transistor TR18 to switch off, being the Schmitt trigger of the block X, so that there is no longer an output across the resistor R33. Thus the voltage across the resistors R39 and R40 and the capacitor C4 is increased accordingly through the agency of the level shift zener diode Z10. The capacitor C4 commences charging, so eventually causing the capacitor C5 to charge slowly further.

When the Schmitt trigger in block W switches "off" (transistor TR11 non-conducting) the procedure is reversed. The capacitor C3 is no longer charged through the diode D1, the transistor TR13 is no longer conducting and thus allows the Darlington pair TR14 and TR15 to be forward biased to discharge the capacitor C3 at a rate decided by their base voltage and hence by the output of the integrator. In due course, the voltage across the capacitor C3 drops to such a value that the transistors TR16 and TR17 switch off, the transistor TR18 switches on, and the voltage across the resistors R39, R40, and the capacitor C4 reduces once more through the agency of the level shift zener diode Z10, allowing the first integrating capacitor C4 to commence to discharge.

Whilst in the first embodiment (FIGS. 1 and 5) the "ON" signal for the integrator was substantially constant throughout the whole cycle of charging, in the present embodiment this "ON" period is varied from a relatively short "ON" period during the initial stages of charging to an "ON" period of similar length to the previous embodiment when the battery is nearly charged.

This change in the period of the "ON" signal is caused by the state of charge on the integrating capacitors C4 and C5. During the earlier period of charging, the charge on the capacitors is high because the "ON" period is long relative to the "OFF," but the effect of the high charge on the integrating capacitors is to raise the voltage at the base electrode of the transistor TR15 and thus cause the Darlington pair TR14 and TR15 to conduct slightly which permits the capacitor C3 to discharge therethrough. The "ON" period is thus reduced or controlled below what it would be in the case of the FIG. 1 embodiment. Later on during the charging process as the "OFF" period increases the voltage across the integrating capacitors reduces and so the rate at which the capacitor C3 discharges through the Darlington pair TR14 and TR15 decreases thus providing a relatively longer "ON" at the stage in the process of charging.

From the above operation of the timing device in block X and the integrator in block Y, it will be appreciated that the "ON" period is an inverse function of the output of the integrator and hence the charging current. The reasons for this are that:

a. With very high charging currents, a long "ON" period could provide a seriously excessive amount of gassing; and
b. When a battery is almost fully charged, it takes some minutes for the maximum gassing rate to be reached at whatever low current is permissible. This maximum gassing rate is necessary in order to ensure a complete charging and cleansing of the electrodes. A minute continuous trickle of charging current is ineffective.

Referring now to Block Y, it will be seen that the circuit arrangement differs slightly from the circuit arrangement in FIG. 3A of my Application Ser. No. 108,317 in that the output to the voltage complex is taken directly across the integrating capacitor C4 through a further integrating capacitor C5 instead of from a tap of potentiometer in the emitter circuit of the output transistors, and the output to the current complex is taken from the junction between the resistors R39 and R40 instead of across the integrating capacitor C4, which means that the voltage applied to the base electrode of the transistor TR20 pulsates with the ON/OFF ratio instead of being a smoothly integrated voltage.

If the ON/OFF ratio is relatively high, i.e., the battery is in a relatively discharged state, the voltage across the capacitor C4 is high, since the circuit will tend to keep the reference voltage as its maximum value E Ref (HIGH). Accordingly, the voltage drop across the resistors R39 and R40 is low, so that the resulting pulse applied to the base electrode of the transistor TR20 is small. This in turn means that the control voltage to the thyristor trigger circuit G is high and contains a pulse of small height whose duration is kept short in addition by the fast discharging of the capacitor C3. Therefore, during the initial stages of charging there is a high-current/low value pulse condition prevailing.

Conversely, as the battery becomes more fully charged, the ON/OFF ratio reduces, and when it becomes small the voltage across the integrating capacitor C4 becomes low whilst the voltage drop across the resistors R39 and R40 becomes very high. This means that the pulse applied to the base electrode of the transistor TR20 is high. However, since the voltage across the integrating capacitor C4 is low and the timing capacitor C3 is discharged more slowly, the pulse applied to the base electrode of the transistor TR20 is also long in duration. This means that the pulse value is very high.

However, between pulses the transistors TR20 and TR21 barely conduct because the voltage across the capacitor C4 is low, hence the control voltage to the thyristor trigger circuit G is low, but contains high-value pulses, and the charging current behaves accordingly. Therefore, during the latter stages of charging there is a low current/high value pulse condition prevailing.

Whilst in the embodiment disclosed in FIG. 1, the timing device was designed to provide a substantially constant "ON" period during the initial stages of charging, the present embodiment takes this process a stage further by reducing the "ON" period during the initial stages of charging. Consequently, during the intial stages of charging the ON and OFF periods are relatively short, so that as looked at from the point of view of the battery, the charging current is almost approaching an extremely rapid series of pulses of high current intensity. Conversely, when the battery is nearly fully charged, the ON period has increased somewhat, whilst the OFF period has very greatly increased, so that the battery gets a series of low current pulses spaced apart by extensive intervals.

Termination of the charge period can be made to occur automatically when the battery is suitably charged by adjustment of the relative rates of change of the reference voltage, the "ON" time, the pulse height, and the charging current as charging proceeds.

Whilst these four parameters of the control device are not only inherently interdependent, they are controlled by the ON/OFF ratio of the charging current control switch, being the Schmitt trigger in the block W, and the timer block X, all in accordance of the state of charge of the battery.

It is a battery characteristic that the rate of decay of terminal voltage is dependent upon the voltage to which it has been raised. If the terminals are raised to a lower voltage, the rate of decay will be slower, and hence the ON/OFF ratio will decrease, so decreasing the terminal voltage further.

Firstly then, as the output of the integrator reduces it will reach a point approaching cut-off of the Darlington pair TR5 and TR6 in series with the second controlled current device. Up to this point, the reference voltage has been decreasing steadily, but it now begins to decrease more rapidly, and in due course as charging continues, it eventually decreases more quickly than the battery terminal voltage. When this stage is reached, it must continue to drop to the value presented when the second controlled current device is non-conducting, that is to say, termination has been effected.

Secondly, as the output of the integrator reduces, so the "ON" time increases because the transistors TR14 and TR15 are not conducting to discharge the timing capacitor C3, and there is a low current/high value pulse condition prevailing. In this condition, there is a tendencey for the terminal voltage of the battery to be raised higher by the high value of the pulse, but to drop lower more quickly during the long "OFF" period. The more rapid drop of terminal voltage under these conditions tends to maintain the charge period in operation.

Thirdly, the provision of a degree of pulsing in the charging current by tapping off from the potential divider formed by the resistors R39 and R40, so providing a nominally instantaneous change of charging current when the Schmitt trigger of the block W operates, likewise provides an instantaneous drop of battery terminal voltage, so tending to maintin the charging period in operation.

Fourthly, it is physically impossible to provide a perfect integrator, and advantage may be taken of this fact in order to control the termination point by adjustment of the time constant of the integrator circuit so that its output as applied to the Darlington pair TR5 and TR6 pulses, so causing the reference voltage to pulse in sympathy with the ON/OFF ratio, and hence with the terminal voltage. As in the first case, the reference voltage can be caused to drop more rapidly than the battery terminal voltage and so effect termination at a suitable point.

Fifthly, instead of returning the negative end of the resistor R42, in the emitter circuit of transistor TR21, to the negative supply rail, it may be returned to an offset circuit in similar manner to the resistor R7 in the emitter circuit of transistor TR5. Such a course would ensure that the charging current and hence the terminal voltage of the battery, would drop more rapidly and so sustain the charging period in operation longer.

Figure 6:
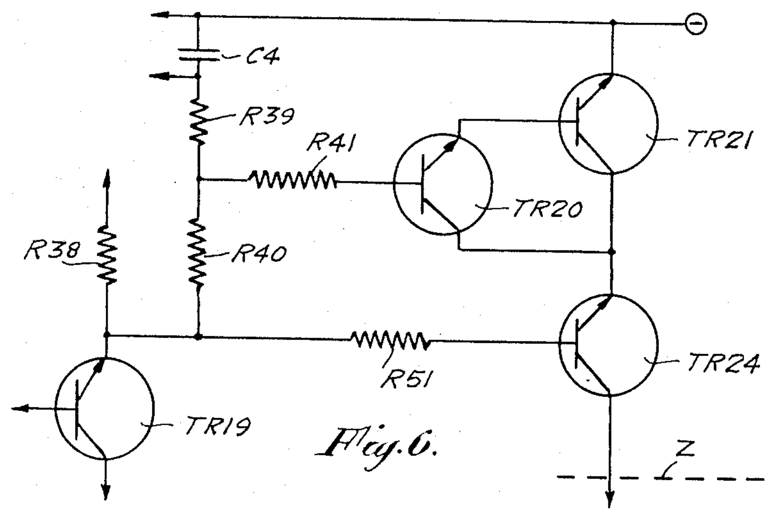
FIG. 6 is a circuit diagram of an additional modification to the circuit of the FIG. 2 embodiment.

Sixthly, if in the extreme case it is desired to continue charging as long as possible, it is possible to arrange for the charging current to drop instantaneously to zero at the beginning of each "OFF" period and so allow the terminal voltage to drop as rapidly as possible between the resuling pulses, whose value will remain a function of the ON/OFF ratio. Referring to FIG. 6, this may be effected by inserting a further transistor TR24 in series with the collector circuit of transistors TR20 and TR21 to act as a switch. The emitter electrode of this further transistor is connected to the collector electrodes of the transistors TR20 and TR21, its collector electrode is connected into the block Z, and its base electrode is driven through a resistor R51 from the emitter electrode of the transistor TR19.

By providing an inverting circuit between the output of the integrating capacitors and the inputs to blocks V or X or both, it is possible to achieve certain other benefits such as temperature compensation, longer life, etc. In each case it is important to remember that the battery has the final say, and when offered various alternatives after a pulse, it will decide that it wants I amps for T minutes. A suitable inverter is shown in FIG. 4 which includes a transistor TR23, resistors R48 to R50 and a zener diode Z13. The base electrode of the transistor TR23 is coupled to the output across the capacitor C5, and the output from the inverter appearing at a terminal 0 has its level shifted by means of the zener diode Z13. Thus coupling this inverting circuit between the capacitor C5 and the resistor R29, will have the opposite effect from that described, i.e., to increase the "ON" period during initial stages of charging and to reduce it during the later stages of charging, thus producing a type of ON/OFF cycle such as that disclosed in my Application Ser. No. 108,317. Looked at another way, the circuitry will produce long, high pulses early on in the charging cycle, gradually settling to short, low ones as the charging cycle progresses.

Coupling this inverting circuit between the capacitor C5 and the resistor R44 will produce a reference voltage which is initally high at the start of the "ON" period but which reduces to the lower limit and then rises to the upper limit during the "OFF" period. Since, initially the reference voltage is unreachable, the integrator voltage builds up, raising the current, reducing the "on" time and gradually lowering the reference voltage. The battery thus gets short high pulses, with a very short "off" time, because it hasn't been given very much terminal voltage to decay from. As the "on" time is reducing as charging progresses, the charging current build up will tend to be less rapid and hence result in an overall increase in charging time.

The third effect is produced by inserting both inputs to bhe blocks V and X. Initially the reference voltage is high, the "on" time very short and the current very low. As the integrator voltage builds up, the reference voltage again being unreachable, the position gradually reverses, the reference voltage dropping, the "on" time lengthening and the charging current building up. when the reference voltage is reached, the timer circuit switches off after the predetermined time, which causes the reference voltage to rise a little. Thus once the reference voltage has been reached, the reference voltage starts to rise on average, the "on" time reduces on average and the charging current reduces on average.

To summarize, the three effects of inversion produce:

1. A rapid initial phase of high intensity charging which gradually reduces to finish very quietly.
2. A long slow charge, but probably the best from the battery's point of view in that if charged in this way it will have a longer expectation of life.
3. The best for temperature compensation.

The battery chargers described in the above embodiments have the advantage that the circuitry provides excellent control of the charging current applied to the battery at all stages during the charging cycle, and the whole system is extremely flexible so as to be able to cope with different types of battery which may require slightly different charging techniques to ensure that the battery is charged in the shortest possible time without too much gas generation and without causing any other sort of permanent damage to the cells which might arise due to overheating or other physical effects.

What I claim and desire to secure by letters patent is:

1. A battery charger for charging batteries by cyclically increasing and decreasing the magnitude of the charging current towards given upper and lower limits: including means for deriving a reference voltage; comparator means for comparing this reference voltage with the terminal voltage of the battery; time controlled switching means operable from the comparator means for providing a constant output signal for a substantially predetermined period, every time the terminal voltage drops below a given value in comparison with the instantaneous value of the reference voltage after the termination of the predetermined period; means for integrating the output of the switch means; means for progressively varying the reference voltage between predetermined upper and lower limits in accordance with the integrated value of the ON/OFF ratio of the switch means; and means for controlling the variation of said charging current between said upper and lower limits in accordance with the output of said switch means.

2. A battery charger according to claim 1, wherein the given lower limit to which the charging current is reduced in each cycle is zero.

3. A battery charger according to claim 1, wherein the charging current is controlled between upper and lower limits in accordance with a function of the integrated output from said switch means.

4. A battery charger according to claim 1, wherein means are provided for controlling the time controlled switching means from the output of the integrator means so as to vary the ON period of the switching means in accordance with the state of charge of the battery.

5. A battery charger according to claim 2, wherein the time controlled switching means includes an input stage; a level controlled switch acting as an output stage; and a capacitor, said capacitor being charged by the ON output signal from the comparator through a diode and said transistor, so as to switch the level controlled switch to provide the said output signal from said time controlled switching means, the capacitor maintaining the level controlled switch in the On state for a predetermined time after the output signal from the comparator has fallen to zero.

6. A battery charger according to claim 4, wherein the time controlled switching means includes an input stage; a capacitor; a level controlled switch acting as an output stage; and means for allowing said capacitor to discharge at any predetermined rate, said capacitor being charged through a diode and said input stage from the ON output signal from the comparator means, so as to switch the level controlled switch to provide the said output signal from said time controlled switching means, the capacitor discharging at a rate determined by the integrated value of the output signal from said time controlled switch means once the ON signal from the comparator has fallen to zero, so as to provide an ON period of the switching means which is dependent on the state of charge of the battery.

7. A battery charger according to claim 6, wherein said capacitor discharging means includes a Darlington pair whose collector-emitter path is in parallel with said capacitor and whose control electrode is connected to the output of said integrator means.

8. A battery charger according to claim 5, wherein said level controlled switch is a Schmitt trigger.

9. A battery charger according to claim 1, wherein said integrating means includes a capacitor, a pair of resistors and a transistor in series across the D.C. supply to the control circuitry, said integrated output for controlling the reference voltage being derived directly across said capacitor and said integrated output for controlling the charging current being derived from the junction point between said pair of resistors.

10. A battery charger according to claim 9, wherein said integrating means additionally includes a zener diode which acts as a level shift from the output of the time controlled switching means.

11. A battery charger according to claim 9, wherein an additional capacitor is provided for smoothing the integrated output which controls the value of the reference voltage.

12. provided battery charger according to claim 1, wherein means are procided for controlling the pulse height in the charging current as an inverse function of the charging current.

13. A battery charger according to claim 9, wherein said means for controlling said pulse height include a voltage to current converter in the form of a Darlington pair.

14. A battery charger according to claim 1, wherein the charging current is controlled by means of at least one thyristor, circuit means being provided for counteracting the sine-function which appears between the thyristor control voltage and the charging current.

15. A battery charger according to claim 14, wherein said circuit means for counteracting the sine-function is in the form of a dynamic load and includes a first zener diode and resistor in parallel therewith between said output from the integrator means and a power stage controlling the thyristor or thyristors, a second zener diode in series with the emitter-collector path of a transistor, said second zener diode preventing the transistor conducting as long as the voltage across the dynamic load exceeds the break-down voltage of the second zener diode, thus providing a corrected linearized signal to said power stage, said first zener diode shifting the origin at which the thyristors will start to conduct so that it coincides with the zero level of the output signal from the integrator means.

16. A controlled current battery charger, including means for deriving a reference voltage; comparator means for comparing this reference voltage with the terminal voltage of the battery; variable time controlled switching means comprising an input stage, a capacitor charged from the input stage, a level controlled switch acting as an output stage for providing a constant output signal for a period of time depending on the rate of discharge of the capacitor, said output signal being produced every time the terminal voltage drops below a given value in comparison with the instantaneous value of the reference voltage after cessation of said constant signal; means for integrating the output of the switch means; means for progressively varying the reference voltage between predetermined upper and lower limits in accordance with the integrated value of the ON/OFF ratio of the switch means; means for controlling the rate of discharge of the capacitor from the output of the integrator means so as to vary the ON period of the time controlled switching means in accordance with the state of charge of the battery; and means for controlling the variation of said charging current between upper and lower limits in accordance with the output from said variable time controlled switching means.

17. A battery charger according to claim 16, wherein an inverter circuit is inserted between the output of the integrator means and the means which allows the capacitor to discharge at a rate determined by the integrated output from the integrator means.

18. A battery charger according to claim 17, wherein said inverter circuit additionally inverts the output from the integrator means which is applied to said means for varying the value of the reference voltage between predetermined upper and lower limits.

19. A battery charger according to claim 1, wherein the means for deriving the reference voltage include a first controlled current source supplying a resistor across which a reference voltage is developed, and wherein the means for varying the value of the reference voltage between upper and lower limits is a second controlled current source arranged in parallel with the first controlled current source to augment the current through the reference resistor, said second controlled current source being progressively switched "on" and "off" so as to raise and lower the reference voltage between said limits in accordance with the output of said integrator means.

20. A battery charger according to claim 19, wherein the output from said integrator means is inverted before being applied to the progressive switching means which control the second current source.

21. A battery charger according to claim 19, wherein means are provided for controlling the time controlled switching means from the output of the integrator means so as to vary the ON period of the switching means in accordance with the state of charge of the battery.

22. A battery charger according to claim 21, wherein the output from said integrator means is inverted before being applied to both the progressive switching means which control the second current source and the time controlled switching means.

23. A battery charger according to claim 16, wherein a transistor stage is inserted in series between the output of the integrator means and a power stage for controlling the charging current, said transistor having its base electrode connected to the output circuit of said transistor in series with the integrating capacitor and a pair of resistors.

* * * * *